Jan. 1, 1929.

L. B. BEATH ET AL 1,696,996

STEEL BARREL

Filed March 29, 1927

Inventors.
Lancelot B. Beath.
William D. Beath.

by H. J. S. Dennison
Atty.

Patented Jan. 1, 1929.

1,696,996

UNITED STATES PATENT OFFICE.

LANCELOT BRISBIN BEATH AND WILLIAM DICK BEATH, OF TORONTO, ONTARIO, CANADA.

STEEL BARREL.

Application filed March 29, 1927. Serial No. 179,344.

The principal objects of the invention are, to produce a barrel with a strong, durable weld connecting the body of the barrel with the head so that the barrel will stand extraordinary strains without breaking the joint.

A further and very important object is to produce a steel barrel which will present a smooth end surface on the chime, thereby obviating the cutting and marring of floors.

A still further object is to simplify the work of welding the circumferential joint on the barrel chime.

The principal feature of the invention consists in the novel construction of the barrel chime, whereby a rigid metal band presenting a smooth end surface to the chime is provided with a narrow welding edge to which the edges of the barrel body and head are united.

Figure 1:
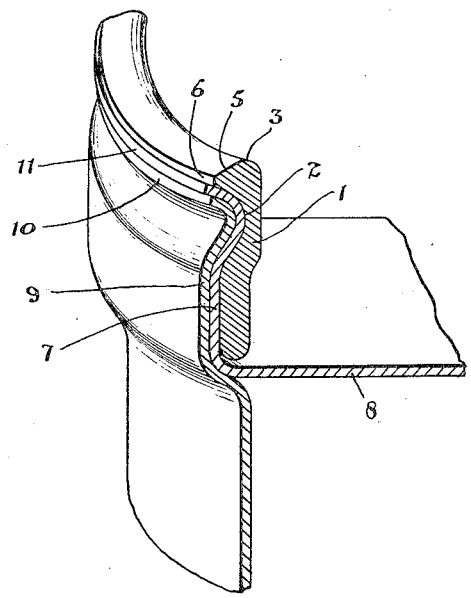

In the drawings, Figure 1 is a sectional perspective view of a portion of a barrel showing my improved construction of rim and the manner of forming the body and head preparatory to welding.

Figure 2:
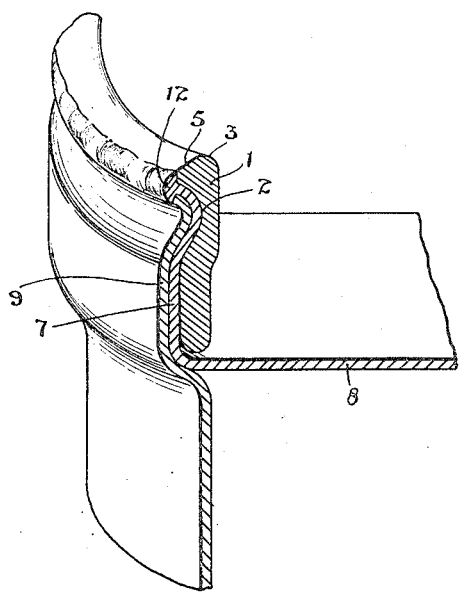

Figure 2 is a sectional perspective view showing the body and head welded to the rim.

In the manufacture of steel barrels the chime has been formed in many different ways by the rolling of the metal into beads and lock seams and these have been reinforced with rims, but so far as we are aware the only form of sheet metal barrels that would withstand rough usage and heavy strains that are put upon it, is that in which the edges of the barrel and head have been welded together. The edge formed by the weld is rough and presents numerous serrated projections which cut and tear floor surfaces very badly.

The present invention has been devised to overcome these numerous difficulties and the metal rim 1 here shown is formed with a peripheral groove 2 in its outer side and the upper edge 3 of the rim is rounded over and is formed with an outwardly sloping surface 5 which converges to meet the groove 2 in a narrow flange 6.

The flange 7 of the barrel head 8 is fitted around the rim 1 and the flanged edge 9 of the barrel encircles the head flange 7. These flanges are rolled into the peripheral groove 2 on the ring 1 and the edge 10 of the barrel sheet is substantially flush with the edge 6 of the rim, while the edge 11 of the head preferably projects slightly beyond said flush edges 6 and 10. The three edges thus arranged are of substantially the same thickness of material and when the welding torch is applied the metal of the slightly projecting edge 11 melts and fuses uniformly on both sides with the metal of the edge 10 of the barrel body and the edge 6 of the rim 1 producing a welded joint 12, such as illustrated in Figure 2.

The important feature is that the three metal surfaces arranged together for welding are of substantially the same thickness and the metal will flux together under the action of the flame to make a very thorough joint.

It is an important feature also that this joint being arranged on the outer side of the rim 1 has the entire support of the rim from inward crushing and the strength of the rim is enhanced by the rolled bead formation of the top edges of the barrel and head.

It will be seen that as the top edge 3 of the rim is smooth and slopes downwardly and outwardly to the weld, the said weld will not touch the floor surfaces, as the barrel is rolled on its edge, but a smooth contact surface is provided.

A construction such as described is extremely simple to manufacture and produces a barrel of very desirable form.

What we claim as our invention is:

1. A steel barrel having the edge of the head flange and the edge of the body turned laterally, and a heavy reinforcing steel rim formed with a lateral flange extending therefrom intermediate of its depth, said flange presenting an edge of substantially the same thickness as the thickness of the body or head metal, the exposed edges of said rim, head and body flanges being welded together on the side of the rim.

2. A steel barrel having the edge portions of the body and head flanges turned laterally outward to expose the edges thereof, and a heavy reinforcing rim formed with a lateral projecting flange intermediate of its depth presenting a narrow edge which is welded with the exposed edges of the barrel and head flange in a joint formed on the outward side of the ring.

3. A steel barrel having a chime formed of a rim of heavy cross section having a peripheral groove intermediate of its depth, the concave wall of which flares outwardly at one side forming a laterally extending flange presenting a thin edge, a head having a flange overlapping said rim, and a body fitted over said head and rim, the edge portions of said body and head being rolled into the peripheral groove in the rim with their edges exposed adjacent to the thin edge extremity of said rim flange, the exposed edges of said head, body and rim being welded together.

4. A steel barrel having a chime formed of a rim having a rounded edge and a peripheral groove in the wall spaced from said rounded edge and forming a peripheral flange having a thin exposed edge, and a body and head having flanged edge portions rolled into said peripheral groove with the edges thereof exposed, said exposed edges of said flanged edge portions being united with the thin edge of said peripheral flange by fusing all of said edges together.

5. A steel barrel having a chime formed with a band having a smooth outer edge and a lateral flange projecting therefrom spaced inwardly from said edge, and a body and head having the edge portions turned laterally to expose the edges thereof, said exposed edges being secured to the edge of said inwardly spaced flange in a fused joint.

LANCELOT BRISBIN BEATH.
WILLIAM DICK BEATH.